Nov. 30, 1954 M. W. BRENNER 2,695,544
EQUIPMENT FOR TESTING THE FLATNESS OF OBJECTS
Filed Nov. 10, 1951
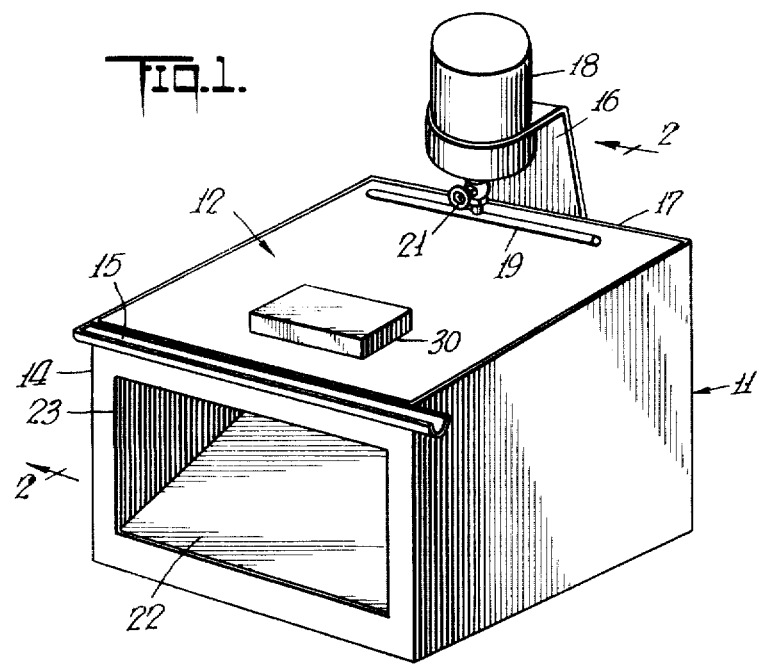
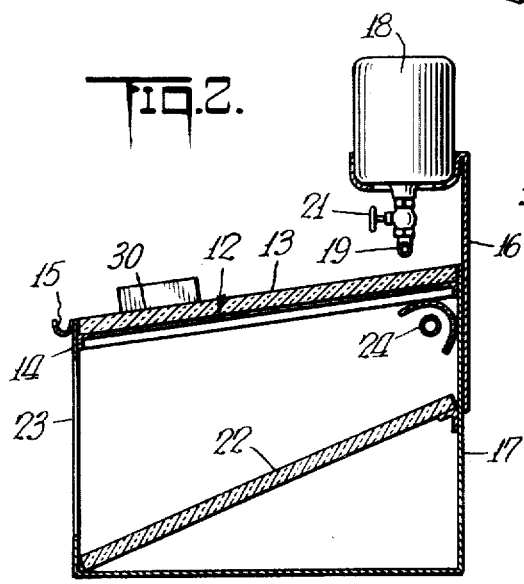
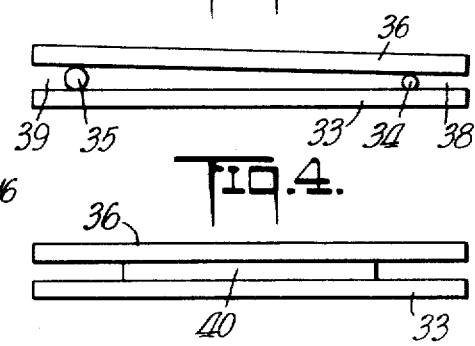
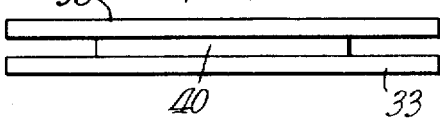
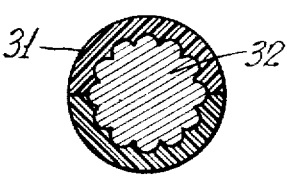
INVENTOR
*Mortimer W. Brenner*
BY
*Dean Fairbank & Hirsch*
ATTORNEYS United States Patent Office 2,695,544
Patented Nov. 30, 1954

2,695,544

EQUIPMENT FOR TESTING THE FLATNESS OF OBJECTS

Mortimer W. Brenner, Hartsdale, N. Y.

Application November 10, 1951, Serial No. 255,846

3 Claims. (Cl. 88—14)

This invention relates to testing equipment and more particularly to equipment for visually checking the flatness of a supposedly plane surface and for determining the thickness of relatively thin objects.

It is among the objects of the invention to provide a relatively simple equipment for testing the flatness of an object with great accuracy, which equipment has but few parts that are not likely to become deranged and do not require adjustment and which may be operated by even an unskilled operator with but a minimum of training and without the need for preparation of the object to be tested.

Another object is to provide a relatively simple equipment for accurately measuring the thickness of extremely thin objects without the use of micrometers or other elaborate and expensive measuring means.

According to the invention, these objects are accomplished by the arrangement and combination of elements hereinafter described and particularly recited in the claims.

In the accompanying drawings in which are shown one or more of various possible embodiments of the several features of the invention, Fig. 1 is a perspective view of the flatness tester, Fig. 2 is a transverse sectional view thereof, taken along line 2—2 of Fig. 1, Figs. 3 and 4 are end views of another embodiment of the invention, and Fig. 5 is a cross sectional view of still another embodiment of the invention.

Referring now to the drawings, the testing equipment shown in Figs. 1 and 2 desirably comprises a substantially rectangular box or chamber 11 having a plate 12 desirably of transparent glass at the top thereof, said plate having its upper surface 13 standardized against a true optical flat. The plate 12 is desirably so positioned that it is inclined downwardly toward the front 14 of the chamber and a trough 15 desirably extends along the front edge of the chamber to collect any liquid that may drip off the plate 12 during operation of the equipment.

The chamber 11 desirably has a vertical support 16 at the rear 17 thereof which mounts a reservoir 18, the latter having its outlet 19 controlled by a valve 21 so that fluid may be discharged onto plate 12 at a controlled rate.

Positioned in the chamber is an inclined reflecting surface 22 desirably a mirror which is designed to reflect the undersurface of plate 12 toward an opening 23 in the front wall of the chamber. Thus an observer looking through said opening 23 may readily view the undersurface of plate 12, a lamp 24 in said chamber illuminating said plate so that its undersurface may be clearly visible.

The reservoir desirably contains a solution of dye of suitable color density so that it may be readily visible and preferably a small amount of wetting agent, say two per cent is mixed into such solution.

To use the equipment the valve 21 is opened so that a small quantity of solution may drop onto the plate 12 to cover at least a portion of its surface with a layer of solution, the wetting agent, which reduces the surface tension of the solution, permitting it to spread readily. The surface 30 of an object to be tested is then placed on the area of plate 12 covered with the solution and the observer may then look through the opening 23 in chamber 11 to view the reflected image of the undersurface of plate 12.

If the surface under test is, for example, within one millionth of an inch of equalling the flatness of the plate 12, the layer of dye solution between such surface and plate 12 will be of such minute thickness that regardless of the color density of the dye solution no appreciable color will be seen by an observer beneath such surface.

If the surface 30 under test is not flat, i. e., if such surface and plate 12 are out of parallelism by say more than one-millionth of an inch, the relatively thicker layer of dye solution beneath surface 30 when viewed by an observer will appear as a dark area.

It is of course to be understood that the amount of precision possible depends upon the color density of the dye solution. Thus, if the dye solution is very dark, minute variations in flatness may be determined and if the dye solution is less dark, only greater variations in flatness may be determined.

By furnishing dye solutions of known density and providing color charts to indicate just what the color would be for different variations in flatness, an observer may readily determine just how much the flatness of the surface under test varies from the optically flat plate 12.

In the event the color of the surface to be tested makes observation of the color of the test solution difficult, a suitable fluorescent substance may be used in the test solution with or without use of a special source of illumination.

The testing principle above described may also be employed for testing surfaces which are not plane in cases where it is possible to utilize a transparent form such as a mold 31 which should fit the object 32 under test perfectly. In such case a dye solution in the mold would form a layer between the inner surface of the mold and the surface of the object under test, and where such surface deviates from the mold by any appreciable amount, the thickness of the layer of dye solution would be such as to render it visible.

With the test equipment above described, there is no need to polish the surface under test as is required when employing the "Newton ring" principle. As a result, no long and delicate procedure is required for preparing the object to be tested.

The embodiments shown in Figs. 3 and 4 may be used to determine the thickness of an object.

In Fig. 3 for example, a plate 33 is provided standardized against a true optical flat. Where a filament 34 is to be tested, it is placed on plate 33 adjacent a filament 35 of known thickness, the plate 33 first desirably being covered with a suitable dye solution so as to cover both of such filaments. A transparent plate 36, also standardized against a true optical flat is then placed on top of the filaments 34 and 35.

If the two filaments 34 and 35 are of the same thickness, the intensity of the dye solution on the sides 38, 39 of the filaments 34, 35 will be identical.

If the filament 34 is thinner than filament 35 then the adjacent surfaces of plates 33 and 36 will be closer on the side 38 of filament 34 than on the side 39 of filament 35. As a result, the layer of dye solution on the side 39 of filament 35 will be thicker than that on the side 38 of filament 34 and such thicker layer will produce a darker color than that on the side 38 of filament 34. By utilizing a dye solution of known density and providing color charts to indicate just what the color would be for certain thicknesses, the thickness of the filament 34 under test may be determined.

In the event the filament 34 under test is thicker than the filament 35, the adjacent surfaces of plates 33 and 36 will be further apart on the side 38 of filament 34 than on the side 39 of filament 35. As a result, the layer of dye solution on side 39 of filament 35 will be thinner than that on side 38 and the color intensity of such thin layer may be used to determine the thickness of the filament 34 under test also by comparison with a color chart as previously pointed out.

In the event a specimen 40 under test is of sufficient size to support the plate 36, such as when a mica disc is being measured, only one specimen is needed, and the color intensity around the specimen 40 when compared with a suitable color chart will indicate the thickness.

The equipment above described, by reason of its simplicity, may be operated by even an unskilled inspector after but a minimum of training, yet will enable the measurement of flatness and thickness with a high degree of accuracy.

As many changes could be made in the above construction and method, and many apparently widely different embodiments of this invention could be made without departing from the scope of the claims, it is intended that all matter contained in the above description or shown in the accompanying drawings shall be interpreted as illustrative and not in a limiting sense.

Having thus described my invention, what I claim as new and desire to secure by Letters Patent of the United States is:

1. Equipment for testing the flatness of a surface comprising an optically flat transparent plate, supporting means for said plate, means carried by said supporting means for applying a dye solution on said plate and means to reflect the undersurface of said plate so that it may readily be viewed by an observer, whereby when such surface under test is placed on said plate with the dye solution intervening, areas of such surface spaced from the plate will have the dye solution intervening and appearing as darker areas than the portions of said surface in contact with said plate.

2. Equipment for testing the flatness of an object, comprising a chamber, an optically flat transparent plate supported by said chamber, a reservoir supported above said plate for applying a dye solution on said plate, a trough along an edge of said plate to receive the solution flowing off the latter and a mirror beneath said plate to reflect the undersurface thereof so that it may readily be viewed by an observer, whereby when such surface under test is placed on said plate with the dye solution intervening, areas of such surface spaced from the plate will have the dye solution intervening and appearing as darker areas than the portions of said surface in contact with said plate.

3. The combination set forth in claim 2 in which a light is provided in said chamber to illuminate the undersurface of said plate.

References Cited in the file of this patent

UNITED STATES PATENTS

| Number | Name | Date |
|---|---|---|
| 171,838 | Munnich | Jan. 4, 1876 |
| 2,250,521 | Boeder | July 29, 1941 |
| 2,438,743 | Feinbloom | Mar. 30, 1948 |

FOREIGN PATENTS

| Number | Country | Date |
|---|---|---|
| 500,892 | Great Britain | Feb. 17, 1939 |